US009659230B2

United States Patent
Subbaian et al.

(10) Patent No.: US 9,659,230 B2
(45) Date of Patent: May 23, 2017

(54) METHODS AND SYSTEMS FOR ESTIMATING SKEW ANGLE OF AN IMAGE

(71) Applicant: XEROX CORPORATION, Norwalk, CT (US)

(72) Inventors: Sudhagar Subbaian, Coimbatore (IN); Sainarayanan Gopalakrishnan, Chennai (IN); Xing Li, Webster, NY (US); Vignesh Doss, Theni (IN); Clara Cuciurean-Zapan, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1 day.

(21) Appl. No.: 14/830,767

(22) Filed: Aug. 20, 2015

(65) Prior Publication Data

US 2017/0053184 A1 Feb. 23, 2017

(51) Int. Cl.
| | |
|---|---|
| *G06K 9/36* | (2006.01) |
| *G06K 9/52* | (2006.01) |
| *G06K 9/46* | (2006.01) |
| *G06T 11/00* | (2006.01) |
| *G06K 9/62* | (2006.01) |
| *G06K 9/32* | (2006.01) |

(52) U.S. Cl.
CPC ............. *G06K 9/52* (2013.01); *G06K 9/3275* (2013.01); *G06K 9/46* (2013.01); *G06K 9/4604* (2013.01); *G06K 9/4647* (2013.01); *G06K 9/6201* (2013.01); *G06K 9/6218* (2013.01); *G06T 11/00* (2013.01); *G06K 2009/4666* (2013.01)

(58) Field of Classification Search
CPC .......... G06K 9/52; G06K 9/46; G06K 9/6201; G06K 9/4604; G06K 9/6218; G06K 2009/4666; G06K 9/48; G06T 11/00; G06T 7/0087; G06T 2207/10016; G06T 7/0085; G06T 5/001
USPC ....... 382/199, 293, 280, 289, 174, 168, 171, 382/173, 181, 190, 237, 276; 356/71
See application file for complete search history.

(56) References Cited

U.S. PATENT DOCUMENTS

| | | | | |
|---|---|---|---|---|
| 5,452,374 A | * | 9/1995 | Cullen | G06K 9/00463 382/293 |
| 5,841,905 A | * | 11/1998 | Lee | G06K 9/00449 382/199 |
| 6,904,170 B2 | * | 6/2005 | Chao | G06K 9/3283 382/174 |
| 7,336,813 B2 | * | 2/2008 | Prakash | G06K 9/186 356/71 |
| 8,064,729 B2 | * | 11/2011 | Li | G06K 9/3283 382/289 |

(Continued)

*Primary Examiner* — Sheela C Chawan (57) ABSTRACT

The disclosed embodiments illustrate methods and systems for estimating a skew angle of an image. The method includes identifying a set of measurable blocks from one or more blocks in said image. The method further includes dilating each measurable block, in said set of measurable blocks, with a predetermined regular structure to create a set of modified measurable blocks. The method further includes selecting a second set of measurable blocks from said set of modified measurable blocks based on a size of each modified measurable block in said set of modified measurable blocks. Thereafter, the method includes determining a slope of each measurable block in said second set of measurable blocks. Further, the slope is utilizable to estimate said skew angle of said image. The method is performed by one or more microprocessors.

24 Claims, 6 Drawing Sheets

(56) References Cited

U.S. PATENT DOCUMENTS 8,160,393 B2 *  4/2012  Honsinger ............ G06K 9/3275
                                                          382/280

* cited by examiner

METHODS AND SYSTEMS FOR ESTIMATING SKEW ANGLE OF AN IMAGE

TECHNICAL FIELD

The presently disclosed embodiments are related, in general, to image processing. More particularly, the presently disclosed embodiments are related to methods and systems for estimating a skew angle of an image.

BACKGROUND

With the advancement in computational capabilities of computing devices, various image-processing operations, which were earlier confined to high-end computational machines, may be performed on various computing devices such as smart-phones, Personal Digital Assistants (PDAs), tablets, desktop computers, laptops, Multi-Functional Devices (MFDs), scanners, printers, etc. For instance, a computing device may be used to estimate a skew angle of an image during scanning or printing of the image. Generally, the skew angle may be estimated in the whole image by utilizing various methods such as projection iterative methods, a paper boundary based method, or a Hough transform method. However, such methods may still be computationally complex, and a performance may not be accurate.

SUMMARY

According to the embodiments illustrated herein, there is provided a method for estimating a skew angle of an image. The method includes identifying a set of measurable blocks from one or more blocks in said image. The method further includes dilating each measurable block, in said set of measurable blocks, with a predetermined regular structure to create a set of modified measurable blocks. The method further includes selecting a second set of measurable blocks from said set of modified measurable blocks based on a size of each modified measurable block in said set of modified measurable blocks. Thereafter, the method includes determining a slope of each measurable block in said second set of measurable blocks. Further, the slope is utilizable to estimate said skew angle of said image. The method is performed by one or more microprocessors.

According to the embodiments illustrated herein, there is provided a system for estimating a skew angle of an image. The system includes one or more microprocessors operable to identify a set of measurable blocks from one or more blocks in said image. The system further includes one or more microprocessors operable to dilate each measurable block, in said set of measurable blocks, with a predetermined rectangular structure to create a set of modified measurable blocks. The system further includes one or more microprocessors operable to select a second set of measurable blocks from said set of modified measurable blocks based on a size of each modified measurable block in said set of modified measurable blocks. Thereafter, the system further includes one or more microprocessors operable to determine a slope of each measurable block in said second set of measurable blocks. The slope is utilizable to estimate said skew angle of said image.

According to the embodiments illustrated herein, there is provided a computer program product for use with a computing device. The computer program product comprises a non-transitory computer readable medium, the non-transitory computer readable medium stores a computer program code for estimating a skew angle of an image. The computer readable program code is executable by one or more microprocessors to identify a set of measurable blocks from one or more blocks in said image. The computer readable program code is executable by one or more microprocessors to dilate each measurable block, in said set of measurable blocks, with a predetermined rectangular structure to create a set of modified measurable blocks. The computer readable program code is further executable by one or more microprocessors to select a second set of measurable blocks from said set of modified measurable blocks based on a size of each modified measurable block in said set of modified measurable blocks. Thereafter, the computer readable program code is executable by one or more microprocessors to determine a slope of each measurable block in said second set of measurable blocks. The slope is utilizable to estimate said skew angle of said image.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example", and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "computing device" refers to a device that includes a processor/microcontroller and/or any other electronic component, or a device or a system that performs one or more operations according to one or more programming instructions. In an embodiment, the computing device has an associated display that may be utilized for displaying one or more images. Examples of the computing device may include, but are not limited to, a desktop computer, a laptop, a PDA, a mobile device, an MFD, a smartphone, a tablet computer (e.g., iPad®, and Samsung Galaxy Tab®), and the like.

A "Multi-Function Device" (MFD) refers to a computing device that can perform multiple functions. Examples of the functions may include, but are not limited to, printing, scanning, copying, faxing, emailing, and the like. In an embodiment, the MFD includes a scanner and a printer for scanning and printing one or more documents, respectively. In an embodiment, the MFD has communication capabilities that enable the MFD to send/receive data and messages in accordance with one or more communication protocols such as, but not limited to, HTTP, FTP, WebDAV, E-mail, SMB, NFS, and TWAIN.

An "image" refers to an electronic file containing content such as text, pictures, and meta-data information such as, but not limited to, a file-format/type, a compression/encryption scheme usable for compressing/encrypting the content, a creation/access timestamp, and so on. In an embodiment, the image may be represented using one or more color schemes such as but not limited to, RGB (Red-Green-Blue), HSV (Hue-Saturation-Value), YCbCr, Grayscale, and so on.

A "grayscale image" refers to an image in which a value of each pixel carries information only intensity information. In an embodiment, the image may be converted into the grayscale image by utilizing a known in the art color to a gray transform or as a result of an image-processing path. In an embodiment, the grayscale image may be referred to as a black-and-white image.

A "block" refers to a set of pixels in the image. In an embodiment, the image (or the grayscale image) may be divided into one or more blocks of a predetermined size. For example, the predetermined size may correspond to a size of 1024×1024.

A "binary block" refers to a block of pixels, in the image, in which each pixel value is represented by a single bit value, i.e., "1" or "0".

A "projection profile" refers to a summation of intensity values of pixels in a binary block of the image. The projection profile may be represented as a graphical plot (e.g., a histogram) to illustrate the summation of the intensity values of pixels. In an embodiment, the projection profile may be determined along a vertical direction or a horizontal direction of the binary block. In an embodiment, if the horizontal projection profile of the binary block is to be determined, the summation of the intensity values of the pixels along the vertical direction of the block may be determined. Similarly, if the vertical projection profile of the binary block is to be determined, the summation of the intensity values of the pixels along the horizontal direction of the block may be determined.

A "region of interest" refers to a portion in a block of the image that include one or more text components, and one or more line components. In an embodiment, the text components correspond to words, phrases or letters in the block of the image. In an embodiment, the region of interest, in each block, of one or more blocks may be determined from the projection profile of each of the one or more blocks, and a boundary condition.

A "cluster" refers to a group of non-zero values in the projection profile of a block.

A "measurable block" refers to a block in the image that satisfies a set of predetermined conditions. In an embodiment, the measurable block may be utilized to estimate a skew angle of the image. In an embodiment, one or more measurable blocks may correspond to a set of measurable blocks.

A "slope" refers to a change in y-coordinates divided by a change in x-coordinates, between any two given points of each measurable block in the image. In an embodiment, the slope may be utilized to estimate a skew angle of the image. For example, in an embodiment, consider two points $(x_1, y_1)$ and $(x_2, y_2)$, the change in x from one to the other is $(x_2 - x_1)$, while the change in y is $(y_2 - y_1)$. Therefore, the slope may be defined as:

$$\text{Slope} = \frac{(y_2 - y_1)}{(x_2 - x_1)}$$

An "estimated angle" refers to an angle determined for each measurable block in the image. In an embodiment, the estimated angle may be determined based at least on a slope of each measurable block. In an embodiment, the estimated angle and a predetermined range of the estimate angle may be utilized to estimate a skew angle of the image.

A "skew angle" refers to an angle by which an image is skewed. In an embodiment, the skew angle may be determined based at least on the slope or the estimated angle, of each measurable block in the image.

An "average" refers to any mathematical operation in which multiple data values are caused to be effectively summarized, for any purpose, as a single data value. For example, an average may correspond, but is not limited, to a mean, a rolling average, a weighted average, a median, a mode, or any result of any applied mathematical or statistical techniques.

Figure 1:
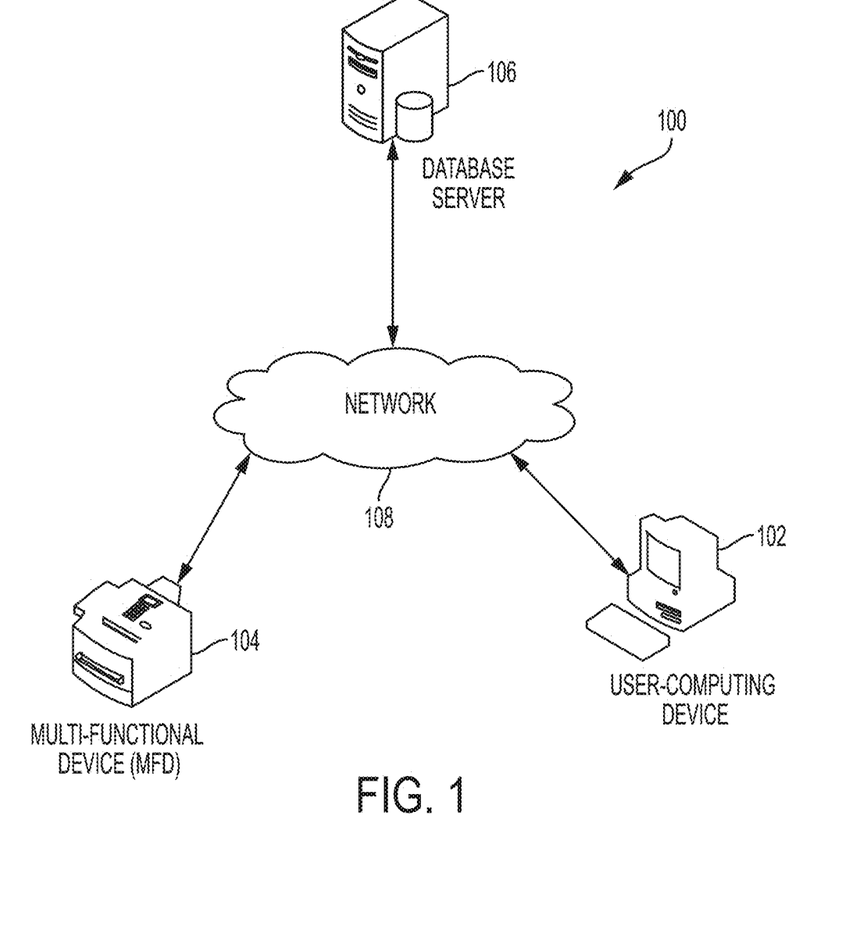
FIG. 1 is a block diagram illustrating a system environment in which various embodiments may be implemented.

FIG. 1 is a block diagram illustrating a system environment 100 in which various embodiments may be implemented. The system environment 100 includes a user-computing device 102, an MFD 104, a database server 106, and a network 108. Various devices in the system environment 100 (e.g. the user-computing device 102, the MFD 104, and the database server 106) may be interconnected over the network 108.

The user-computing device 102 refers to a computing device used by a user. In an embodiment, using the user-computing device 102, the user may input an image, whose skew angle needs to be estimated. In an embodiment, the user-computing device 102 may transmit the image to the MFD 104, where the MFD 104 may perform the skew angle estimation. In another embodiment, the user-computing device 102 may estimate the skew angle. For example, the user may provide the input to select a region of interest in each of one or more blocks in the image. Further, the user may provide the input corresponding to a predetermined size of one or more blocks. Further, the user may provide the input corresponding to the predetermined threshold values to determine whether a block is a measurable block. In an embodiment, the measurable blocks in the image may be used to estimate the skew angle of the image. In an embodiment, the user associated with the user-computing device 102 may store the predetermined threshold values in the database server 106. The user may provide the inputs using input devices (e.g., keyboard, computer-mouse, and touch interface) associated with the user-computing device 102. In an embodiment, the user-computing device 102 may have an associated display that may be utilized for displaying a skewed image.

In an embodiment, the user-computing device 102 may also be utilized to access the MFD 104 over the network 108. Further, the user may provide various types of input, as disclosed above, by accessing the MFD 104. For example, the user may provide the input through an interface provided by the MFD 104.

In an embodiment, the user-computing device 102 may correspond to various types of computing devices, such as, but not limited to, a desktop computer, a laptop, a PDA, a mobile device, a smartphone, a tablet computer (e.g., iPad®, and Samsung Galaxy Tab®), and the like.

The MFD 104 refers to a computing device that may estimate a skew angle of an image. In an embodiment, the MFD 104 may convert the image into a grayscale image by utilizing a known in the art color to a gray transform or by an image-processing path. The grayscale image may be further preprocessed such as to create a suitable input for determining the skew angle of the image. In an embodiment, the MFD 104 may preprocess the grayscale image by adjusting the dynamic range of pixel's intensity. Further, the MFD 104 may divide the grayscale image into one or more blocks of a predetermined size. Further, the MFD 104 may binarize pixels of each block in the one or more blocks to obtain one or more binary blocks. In an embodiment, the MFD 104 may identify whether a binary block, from the one or more binary blocks is a measurable block based on predetermined threshold values. As discussed above, in an embodiment, the predetermined threshold values for identifying the measurable blocks may be provided by the user of the user-computing device 102. In another embodiment, a manufacturer of the MFD 104 may pre-store the predetermined threshold values for identifying the measurable blocks and store the predetermined threshold values in a memory of the MFD 104. In an embodiment, the identification of the measurable blocks has been described in conjunction with FIG. 3, and FIG. 4.

Thereafter, the MFD 104 may determine a slope of each measurable block. Based on the determined slope, the MFD 104 may determine an estimated angle of the image. Thereafter, based on the determined estimated angle, the MFD 104 may estimate the skew angle of the image. The estimation of the skew angle of the image has been described later in conjunction with FIG. 3, and FIG. 5.

In an embodiment, the MFD 104 may correspond to various types of computing devices, such as, but not limited to, printers, scanners, copiers, fax-machines, desktop computers, laptops, PDAs, smartphones, mobile devices, tablet computers, and the like.

A person having ordinary skill in the art will understand that the scope of the disclosure is not limited to the MFD 104 estimating the skew angle of the image. In an embodiment, the user-computing device 102 may process the image to estimate the skew angle of the image, without departing from the scope of the disclosure. For example, the user-computing device 102 (e.g., a mobile phone) may process the image to estimate the skew angle of the image.

The database server 106 refers to a computing device that may store the image. In an embodiment, the database server 106 may store various types of metadata information associated with the image. Examples of the metadata information may include, but is not limited to, a file-format/type, a compression/encryption scheme usable for compressing/encrypting the content, a creation/access timestamp, and so on. In an embodiment, the database server 106 may store a grayscale image. Further, in an embodiment, the database server 106 may store the predetermined size of one or more blocks. In an embodiment, the database server 106 may store the predetermined threshold values usable for the image processing operations. Furthermore, the database server 106 may store estimated angle for each measurable block in the second set of measurable blocks. Thereafter, the database server 106 may store a skew angle of the image.

In an embodiment, the database server 106 may receive a query from the user-computing device 102 and/or the MFD 104 for retrieving various types of information stored in the database server 106. For querying the database server 106, one or more querying languages may be utilized, such as, but not limited to, SQL, QUEL, DMX, and so forth. Further, the database server 106 may be realized through various technologies such as, but not limited to, Microsoft® SQL Server, Oracle®, IBM DB2®, Microsoft Access®, PostgreSQL®, MySQL® and SQLite®, and the like. In an embodiment, the database server 106 may connect to the user-computing device 102 and/or MFD 104, using one or more protocols such as, but not limited to, ODBC protocol and JDBC protocol.

It will be apparent to a person skilled in the art that the functionalities of the database server 106 may be incorporated into the MFD 104, without departing from the scope of the disclosure. In such a scenario, various types of information, as disclosed above, may be stored in the MFD 104.

The network 108 corresponds to a medium through which content and messages flow between various devices of the system environment 100 (e.g., the user-computing device 102, the MFD 104, and the database server 106). Examples of the network 108 may include, but are not limited to, a Wireless Fidelity (Wi-Fi) network, a Wide Area Network (WAN), a Local Area Network (LAN), or a Metropolitan Area Network (MAN). Various devices in the system environment 100 can connect to the network 108 in accordance with various wired and wireless communication protocols such as Transmission Control Protocol and Internet Protocol (TCP/IP), User Datagram Protocol (UDP), and 2G, 3G, or 4G communication protocols.

Figure 2:
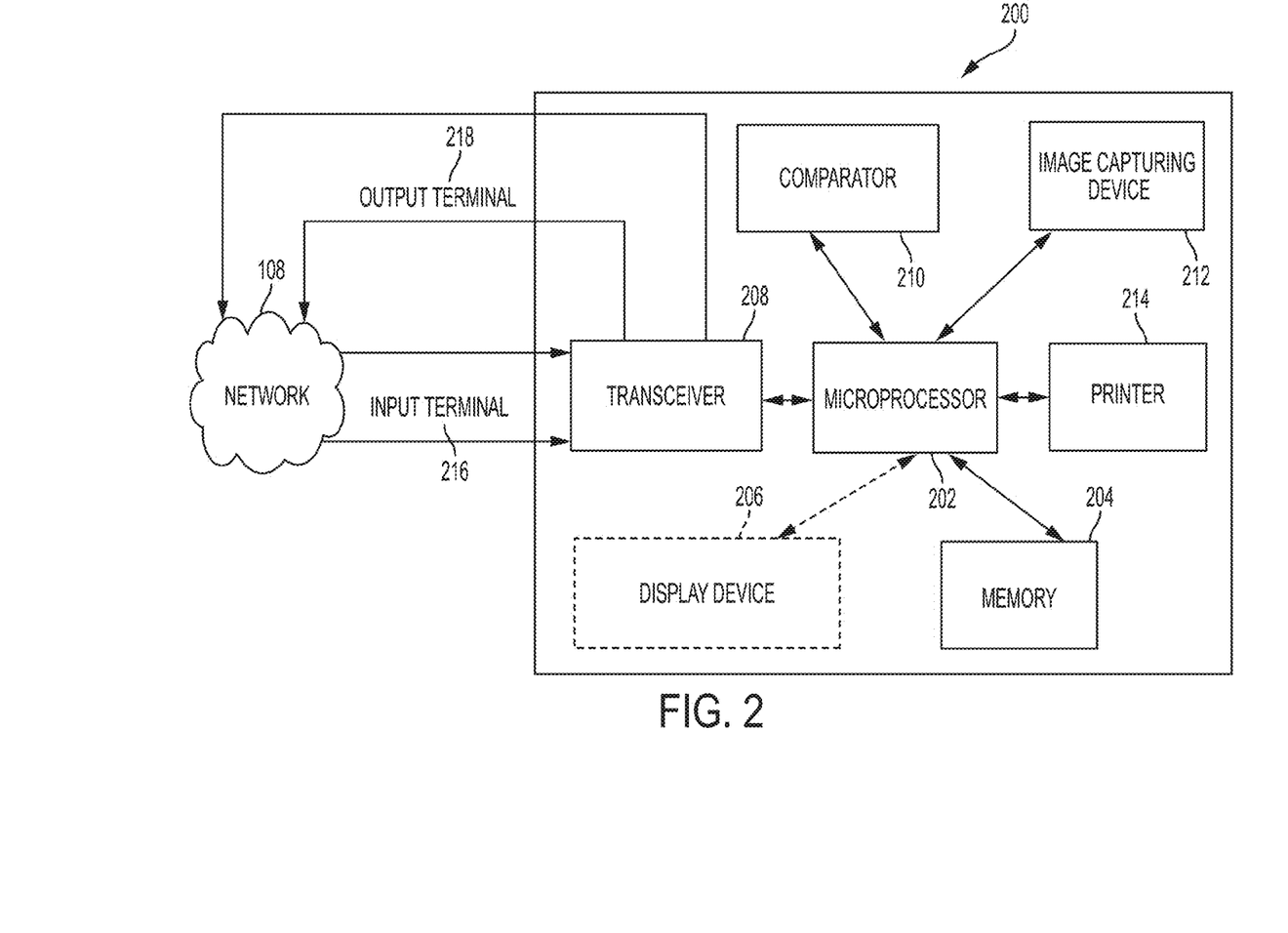
FIG. 2 is a block diagram illustrating a computing device, in accordance with at least one embodiment.

FIG. 2 is a block diagram illustrating a computing device 200, in accordance with at least one embodiment. The computing device 200 may correspond to at least one of the user-computing device 102 or the MFD 104. In an embodiment, the computing device 200 includes a microprocessor 202, a memory 204, a display device 206, a transceiver 208, a comparator 210, an image-capturing device 212, and a printer 214. The transceiver 208 is coupled to the network 108 through an input terminal 216 and an output terminal 218.

The microprocessor 202 is coupled to the memory 204, the display device 206, the transceiver 208, the comparator 210, the image-capturing device 212, and the printer 214. The microprocessor 202 includes suitable logic, circuitry, and/or interfaces that are operable to execute one or more instructions stored in the memory 204 to perform predetermined operation. The memory 204 may be operable to store the one or more instructions. The microprocessor 202 may be implemented using one or more processor technologies known in the art. Examples of the microprocessor 202 include, but are not limited to, an x86 microprocessor, a RISC microprocessor, an ASIC microprocessor, a CISC microprocessor, or any other microprocessor.

A person skilled in the art will appreciate that the scope of the disclosure should not be limited to the computing device 200 including a single processor. The computing device 200 may include more than one microprocessors, which may operate in parallel and perform the one or more predetermined operations. Further, in an embodiment, the microprocessor 202 may be capable of performing more than one operations in parallel. For example, the microprocessor 202 may be a multi-threaded processor, which may execute more than one threads/processes concurrently. Each such thread/process may be executed to perform a predetermined operation.

The memory 204 stores a set of instructions and data. Some of the commonly known memory implementations include, but are not limited to, a Random Access Memory (RAM), a Read Only Memory (ROM), a Hard Disk Drive (HDD), and a Secure Digital (SD) card. Further, the memory 204 includes the one or more instructions that are executable by the microprocessor 202 to perform specific operations. It will be apparent to a person having ordinary skill in the art that the one or more instructions stored in the memory 204 enables the hardware of the computing device 200 to perform the predetermined operation.

The display device 206 facilitates the user to view information presented on the computing device 200. For example, the user may view the images on the display device 206. In an embodiment, the display device 206 may display corrected (i.e., skewed) image. The display device 206 may be realized through several known technologies, such as Cathode Ray Tube (CRT) based display, Liquid Crystal Display (LCD), Light Emitting Diode (LED) based display, Organic LED based display, and Retina Display® technology. In an embodiment, the display device 206 can be a touch screen that is operable to receive a user-input.

The transceiver 208 transmits and receives messages and data to/from various components of the system environment 100 (e.g., the user-computing device 102, and the MFD 104) over the network 108. In an embodiment, the transceiver 208 may receive the predetermined thresholds from the user associated with the user-computing device 102. In an embodiment, the transceiver 208 is coupled to the input terminal 216 and the output terminal 218 through which the transceiver 208 may receive and transmit data/messages, respectively. Examples of the transceiver 208 may include, but are not limited to, an antenna, an Ethernet port, a USB port, or any other port that can be configured to receive and transmit data. The transceiver 208 transmits and receives data/messages in accordance with the various communication protocols such as TCP/IP, UDP, and 2G, 3G, or 4G communication protocols.

The comparator 210 is configured to compare at least two input signals to generate an output signal. In an embodiment, the output signal may correspond to either "1" or "0". In an embodiment, the comparator 210 may generate output "1" if the value of a first signal (from the at least two signals) is greater than a value of the second signal (from the at least two signals). Similarly, the comparator 210 may generate an output "0" if the value of the first signal is less than the value of the second signal. In an embodiment, the comparator 210 may compare a length of each of one or more clusters, a maximum value, a minimum value, and an average value, in each of the one or more clusters with respective predetermined thresholds. In an embodiment, the comparator 210 may be realized through either software technologies or hardware technologies known in the art. Although, the comparator 210 is depicted as independent from the microprocessor 202 in FIG. 2, a person skilled in the art will appreciate that the comparator 210 may be implemented within the microprocessor 202 without departing from the scope of the disclosure.

The image-capturing device 212 captures a document to create an image. In an embodiment, the image-capturing device 212 may include a camera (not shown) that may be in-built in the computing device 200. In alternate embodiment, the image-capturing device 212 scans the document to form the image. In an embodiment, the image-capturing device 212 may include a scanner (not shown) that may be in-built in the computing device 200. In an alternate embodiment, the image-capturing device 212 may be external to the computing device 200 and communicatively coupled to the computing device 200 through any wired or wireless connection. A wired connection may include, but is not limited to, a Universal Serial Bus (USB) cable, a High-Definition Multimedia Interface (HDMI) cable or any other wired connection. A wireless connection may include, but is not limited to, Bluetooth, Wireless LAN (WLAN), Wireless Personal Area Network (WPAN), or any other wireless connection. The image-capturing device 212 may be implemented using one or more image sensing technologies known in the art such as, but not limited to, a Charge-Coupled Device (CCD) based image sensor and a Complementary Metal Oxide Semi-conductor (CMOS) based image sensor. In an embodiment, the image-capturing device 212 may include various types of devices, such as, but not limited to, scanners, copiers, fax-machines, and the like.

The printer 214 is configured to print the document to obtain an image. In an embodiment, the printer 214 may print the skewed image based on the skew angle of the image. In an embodiment, the printer 214 may be external to the computing device 200 and communicatively coupled to the computing device 200 through any wired or wireless connection. A wired connection may include, but is not limited to, a Universal Serial Bus (USB) cable, a High-Definition Multimedia Interface (HDMI) cable or any other wired connection. A wireless connection may include, but is not limited to, Bluetooth, Wireless LAN (WLAN), Wireless Personal Area Network (WPAN), or any other wireless connection. The printer 214 may correspond to any apparatus, such as a digital copier, bookmaking machine, facsimile machine, multi-function machine (performs scanning, emailing), and the like.

Figure 3:
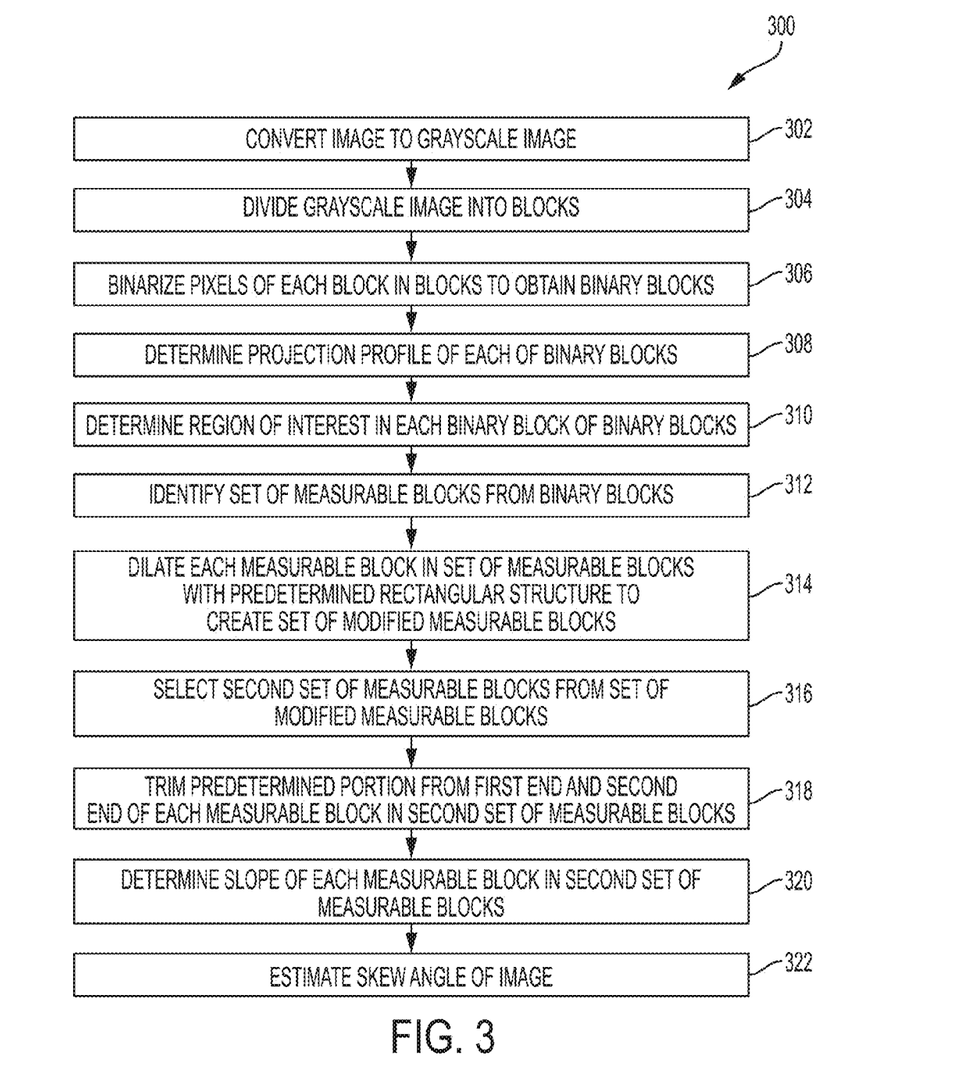
FIG. 3 is a flowchart illustrating a method for processing an image to estimate a skew angle of the image, in accordance with at least one embodiment.

An embodiment of the operation of the computing device 200 for processing of the image to determine the skew angle of the image has been described in conjunction with FIG. 3.

For the purpose of the ongoing description, the computing device 200 has been considered the MFD 104; however, a person skilled in the art will appreciate that the scope of the disclosure is not restricted to the computing device 200 as the MFD 104. In an embodiment, the computing device 200 may be realized as the user-computing device 102.

FIG. 3 is a flowchart 300 illustrating a method for processing the image to estimate a skew angle of the image, in accordance with at least one embodiment. The flowchart 300 is described in conjunction with FIG. 1 and FIG. 2.

At step 302, an image is converted to a grayscale image. In an embodiment, the microprocessor 202 may convert the image to the grayscale image by utilizing a known in the art color to a gray transform or as a result of an image-processing path. The grayscale image may be further pre-processed such as to create a suitable input for determining the skew angle of the image. In an embodiment, the MFD 104 may preprocess the grayscale image by adjusting the dynamic range of pixel's intensity. In an embodiment, the grayscale image may correspond to an image in which value of each pixel carries only intensity information. Prior to converting the image, the microprocessor 202 may extract the image from the database server 106, or may receive the image from user associated with the user-computing device 102. Thereafter, the microprocessor 202 may convert the image to the grayscale image. In an embodiment, the microprocessor 202 may utilize the background suppression technique to remove a color of the image by adjusting dynamic range of pixel's intensity of the image. In an embodiment, the grayscale image may correspond to a black-and-white image. In an embodiment, the microprocessor 202 may store the grayscale image in the database server 106.

A person having ordinary skill in the art will understand that the scope of the disclosure is not limited to the aforementioned techniques to convert the image to the grayscale image. In an embodiment, the microprocessor 202 may employ other techniques as well to convert the image, without departing from the scope of the disclosure.

At step 304, the grayscale image is divided into one or more blocks. In an embodiment, the microprocessor 202 may divide the grayscale image into the one or more blocks of a predetermined size. In an embodiment, the microprocessor 202 may obtain the predetermined size from the user-computing device 102. In another embodiment, the predetermined size may be pre-stored in the MFD. In an embodiment, the predetermined size may be represented as m×n, where m corresponds to a count of pixels along the x-axis of the image and n corresponds to number of pixels along the y-axis of the image. For example, the block size "m×n" may be 1024×1024.

A person skilled in the art will appreciate that the scope of the disclosure should not be limited to dividing the grayscale image into blocks m×n (e.g., 1024×1024). In an embodiment, the microprocessor 202 may divide the grayscale image into blocks m×n (e.g., 512×512, and 256×256 etc.), and so on, without departing from the scope of the disclosure.

At step 306, pixels of each block in the one or more blocks are binarized. In an embodiment, the microprocessor 202 may binarize the pixels of each block in the one or more blocks to obtain one or more binary blocks. In an embodiment, the pixels in the one or more binary blocks may have only two values, i.e., either "0" or "1". For example, in an embodiment, the microprocessor 202 may represent each of the one or more binary blocks as "X". For example, if there are eight binary blocks, then the microprocessor 202 may represent the binary blocks as $X_1, X_2, X_3, \ldots, X_8$.

At step 308, a projection profile of each of the one or more binary blocks is determined. In an embodiment, the microprocessor 202 may determine the projection profile of each of the one or more binary blocks. In an embodiment, the projection profile of a binary block may be at least a horizontal projection profile, or a vertical projection profile. Therefore, the projection profile may be determined along a vertical direction or a horizontal direction of the binary block.

For instance, in an embodiment, the microprocessor 202 may determine the horizontal projection profile for each of the one or more binary blocks. Further, the microprocessor 202 determines the summation of intensity values of pixels along the vertical direction of the block. Thereafter, based on the summation of the intensity values of pixels along the vertical direction of the blocks, the microprocessor 202 determines the horizontal projection profile. In an embodiment, the microprocessor 202 may represent the horizontal projection profile as one-dimensional data of block size "m":

$$P_1(X) = [X_1, X_2, X_3, \ldots, X_m] \quad (1)$$

where,
$P_1(X)$=Horizontal Projection Profile,
$X_1, X_2, X_3, \ldots, X_8$=Binary Blocks, and
m=Block Size.

For example, in an embodiment, if the microprocessor 202 determines the horizontal projection profile of a binary block of 3×3 size that is given as:

$$\begin{bmatrix} 1 & 1 & 1 \\ 0 & 1 & 1 \\ 1 & 0 & 1 \end{bmatrix} \quad (2)$$

Thereafter, the microprocessor 202 determines the summation of the intensity values of the pixels along the vertical direction of the block. Therefore, the determined horizontal projection profile is [3, 2, 2]. Similarly, if the microprocessor 202 determines the vertical projection profile of the equation 2, then the microprocessor 202 determines the summation of the intensity values of the pixels along the horizontal direction of the binary block. Therefore, the determined vertical projection profile is [2, 2, 3].

A person skilled in the art will understand that the scope of the disclosure should not be limited to the above-mentioned method only for determining the projection profile of each of the one or more binary blocks. In an embodiment, the microprocessor 202 may employ other methods such as, but not limited to a Hough transform method, etc. to determine the projection profile of each of the one or more binary blocks, without departing from the scope of the disclosure.

At step 310, a region of interest (ROI) in each binary block of the one or more binary blocks is determined. In an embodiment, the microprocessor 202 may determine the region of interest in each binary block based at least on the projection profile of the binary block and a boundary condition. Further, in an embodiment, the microprocessor 202 may determine the boundary condition for each of the one or more binary blocks for determining the ROI vector. In an embodiment, the microprocessor 202 may determine the boundary condition based on a presence of text within each of the one or more binary blocks. In an embodiment, the boundary condition may correspond to a condition that may be satisfied at all or part of the boundary of a region in which an equation is satisfied. In an embodiment, the region of interest may include, but is not limited to, one or more text components, or one or more line components. In an embodiment, the one or more text components may correspond to words, letters, or phrases in the binary block of the image.

In an embodiment, the microprocessor 202 may utilize the following equation to determine the region of interest, ROI vector:

$$P_2(X_z) = \begin{cases} P_1(X_z), & \text{if } (k_1 * n) \leq P1(X_Z) \leq (k_2 * n) \\ 0, & \text{Otherwise} \end{cases} \quad (3)$$

where $z = 1$ to $m$ where,
z=Index of projection profile vector,
$k_1, k_2$=Predetermined values, and
$P_2(X_z)$=ROI vector.

For example, as discussed above, the microprocessor 202 determines the horizontal projection profile, $P_1(X)$. For instance, $P_1(X)$={20, 50, 600, 500, 700, 450, 900, 1000, 120, 400, 450, 40, 90, 20, −400, 650, 10, 9 . . . . }. Further, the microprocessor 202 may determine the values of $k_1, k_2$ through testing, training, and/or experimentation. In an embodiment, the values of $k_1, k_2$ may be selected based on the one or more measurable blocks required. For instance, the microprocessor 202 may select values of $k_1, k_2$ as 0.3 and 0.8, respectively. Further, the microprocessor 202 may select the block size as 1024×1024. Therefore, $k_1*n$=307, and $k_2*n$=819. Based on the determined projection profile, $P_1(X)$, and the boundary condition, the microprocessor 202 may utilize the equation 3 to determine the region of interest in each binary block of the one or more binary blocks. The determined ROI vector $P_2(X)$ is {0, 0, 600, 500, 700, 450, 0, 0, 0, 400, 450, 0, 0, 0, 400, 650, 0, 0}.

A person skilled in the art will understand that the scope of the disclosure should not be limited to the above-mentioned method for determining the region of interest in each of the one or more binary blocks. In an embodiment, the microprocessor 202 may employ other techniques such as image-processing techniques to determine the region of interest in each binary block of the one or more binary blocks, without departing from the scope of the disclosure.

At step 312, a set of measurable blocks is identified. In an embodiment, the microprocessor 202 may identify the set of measurable blocks from the one or more binary blocks based at least on the projection profile of each of the one or more binary blocks.

Prior to identifying the set of measurable blocks, the microprocessor 202 may determine one or more clusters of non-zero values in the region of interest of the projection profile of each of the one or more binary blocks. Based on the determined one or more clusters of the non-zero values, the microprocessor 202 may determine length of each of the one or more clusters. Further, the microprocessor 202 may determine a maximum value, a minimum value, and an average value of the non-zero values in each of the one or more clusters. For example, as discussed above, for a binary block, X, the microprocessor 202 determines the region of interest $P_2(X)$ vector from the projection profile of the binary block, $P_1(X)$. The ROI vector $P_2(X)$ is {0, 0, 600, 500, 700, 450, 0, 0, 0, 400, 450, 0, 0, 0, 400, 650, 0, 0}. Further, the microprocessor 202 forms the three clusters of the non-zero values in the region of interest $P_2(X)$ vector. Thereafter, the microprocessor 202 determines the length of each of the three clusters, the maximum value, the minimum value, and the average value in each of the three clusters. The following table 1 illustrates the three clusters of the non-zero values in the ROI vector:

TABLE 1

One or more clusters of the non-zero values in the ROI vector.

| One or more Clusters | Non-zero Values | Length | Maximum Value | Minimum Value | Average Value |
|---|---|---|---|---|---|
| Cluster, $C_1$ | 600, 500, 700, 450 | 4 | 700 | 450 | 562.5 |
| Cluster, $C_2$ | 400, 450 | 2 | 450 | 400 | 425 |
| Cluster, $C_3$ | 400, 650 | 2 | 650 | 400 | 525 |

As depicted in Table 1, the microprocessor 202 determines the length, the maximum value, the minimum value, and the average value in each of the one or more clusters. For example, the Cluster $C_1$ has length "4", the maximum value "700", the minimum value "450", and the average value "562.5". Similarly, the Cluster $C_2$ has the length "2", the maximum value "450", the minimum value "400", and the average value "425".

Post determining the values of each of the one or more clusters, in an embodiment, the microprocessor 202 may utilize the comparator 210 to compare the length, the maximum value, the minimum value, and the average value with the respective predetermined thresholds. The thresholds may be predetermined through testing, training, and/or experimentation. Based on the comparison, the microprocessor 202 may identify the set of measurable blocks from the one or more binary blocks. The identification of the set of measurable blocks has been described later in conjunction with FIG. 4. In an embodiment, the microprocessor 202 may receive the predetermined thresholds from the user associated with the user-computing device 102. In an alternate embodiment, the microprocessor 202 may extract the predetermined thresholds from the database server 106. In an embodiment, the microprocessor 202 may utilize the following below equation to determine whether the binary block is a measurable block:

If $(C_L > t_1 \& C_{min} > t_2 \& C_{mean} - C_{min} < t_3 \& C_{max} - C_{mean} < t_4)$==True  (4)

Measurable Block
else
Non-measurable Block
where,
$C_L$=Length of a cluster,
$C_{min}$=Minimum value of a cluster,
$C_{mean}$=Average value of a cluster,
$C_{max}$=Maximum value of a cluster, and
$t_1, t_2, t_3, t_4$=Thresholds.

For example, as discussed above, the microprocessor 202 determines the length, the maximum value, the minimum value, and the average value in each of the one or more clusters. Further, the microprocessor 202 may use predetermined thresholds for each of the one or more binary blocks as $t_1, t_2, t_3, t_4$=2%, 40%, 20%, 20% of block width, respectively. As discussed above, the thresholds may be predetermined through testing, training, and/or experimentation. Thereafter, based on the predetermined thresholds, the microprocessor 202 may perform the comparison by utilizing the equation 4 to determine whether the binary block is a measurable block or not.

A person skilled in the art will appreciate that the table 1 mentioned above has been provided only for illustration purposes and should not limit the scope of the disclosure to these clusters of the non-zero values. In an embodiment, the microprocessor 202 may determine different clusters in the projection profile of each of the one or more binary blocks, without departing from the scope of the disclosure.

Further, a person skilled in the art will appreciate that the microprocessor 202 may repeat steps from step 308 to step 312 for each of the one or more binary blocks to determine the measurable block.

At step 314, each measurable block in the set of measurable blocks is dilated with a predetermined rectangular structure. In an embodiment, the microprocessor 202 may dilate each measurable block in the set of measurable blocks with the predetermined rectangular structure to create a set of modified measurable blocks, B(X).

Prior to dilating each measurable block, the microprocessor 202 may determine a size of the rectangular structure element. Thereafter, the microprocessor 202 performs dilation of each measurable block in the second set of measurable blocks with the predetermined rectangular structure element. For example, in an embodiment, the microprocessor 202 may use size of the rectangular structure element as 0.005% of block height and 0.04% of block width, respectively. The size may be determined through experimentation. Thereafter, the measurable block is dilated with the rectangular structure element to create the modified measurable block, B(X).

In an embodiment, the microprocessor 202 may perform the dilation of each measurable block in order to have a consistent measurement of the set of modified measurable blocks by utilizing morphological operations. In an embodiment, the microprocessor 202 may store the set of modified measurable blocks in the database server 106.

After creating the set of modified measurable blocks, the microprocessor 202 performs connected component-based processing on each modified measurable block in the set of modified measurable blocks. Thereafter, the microprocessor 202 may assign labels to each group of connected binary pixels of the set of modified measurable blocks, B(X). For example, in an embodiment, the microprocessor 202 may represent the labelled modified measurable block as B($X_N$), where N represents the $N^{th}$ label in the modified measurable block, B(X).

At step 316, a second set of measurable blocks from the set of modified measurable blocks is selected. In an embodiment, the microprocessor 202 may select the second set of measurable blocks from the set of modified measurable blocks based on the size of each modified measurable block in the set of modified measurable blocks. As discussed above, the size of each modified measurable block may correspond to a block height, or a block width. Prior to selecting the second set of measurable blocks, the microprocessor 202 may define a minimum width of the labelled modified measurable block as at least $w_1$ through experimentation. Further, the microprocessor 202 may define height "N" of the labelled modified measurable block must be lie between $h_1$ and $h_2$ through experimentation. In an embodiment, the microprocessor 202 may define the $w_1$ as 20% of the block width 'n', and the $h_1$ and $h_2$ as 4% and 25% of block height 'm', respectively. Thereafter, based on the predefined size, the microprocessor 202 selects the second set of measurable blocks from the set of modified measurable blocks. In an embodiment, the microprocessor 202 may utilize the second set of measurable blocks to estimate the skew angle of the image.

At step 318, a predetermined portion from a first end and a second end of each measurable block in the second set of measurable blocks is trimmed. In an embodiment, the microprocessor 202 may trim the predetermined portion from the first end and the second end of each measurable block in the second set of measurable blocks. In an embodiment, the first end and the second end may be longitudinal ends of each measurable block in the second set of measurable blocks.

At step 320, a slope of each measurable block in the second set of measurable blocks is determined. In an embodiment, the microprocessor 202 may determine the slope of each measurable block in the second set of measurable blocks by dividing a change in y-coordinates with a change in x-coordinates, between any two given points of each measurable block in the image. For example, in an embodiment, if there are two points $(x_1,y_1)$ and $(x_2,y_2)$, the change in x from one to the other is $(x_2-x_1)$, while the change in y is $(y_2-y_1)$. Thereafter, the microprocessor 202 may utilize the following below equation to determine the slope:

$$\text{Slope} = \frac{(y_2 - y_1)}{(x_2 - x_1)} \quad (5)$$

where,
$(y_2-y_1)$=Change in y-coordinates, and
$(x_2-x_1)$=Change in x-coordinates.

Post determining the slope of each measurable block in the second set of measurable blocks, the microprocessor 202 may determine an estimated angle of each measurable block in the second set of the measurable blocks. In an embodiment, the microprocessor 202 may utilize the following below equation to determine the estimated angle:

$$A(X_N) = \tan^{-1}(\text{Slope of label } N) \quad (6)$$

where,
$A(X_N)$=Estimated angle for 1 to N label, and
Slope of label N=Slope of second set of measurable blocks, N.

For example, as discussed above, if the slope of the measurable block is 0.75, then the microprocessor 202 utilizes the equation 6 to determine the estimated angle, i.e., 0.6435 radians. In an embodiment, the microprocessor 202 may store the determined estimated angle in the database server 106.

At step 322, a skew angle of the image is estimated. In an embodiment, the microprocessor 202 may estimate the skew angle of the image based at least on the estimated angle. In an embodiment, the microprocessor 202 may determine the estimated angle of each measurable block in the second set of measurable blocks from the determined slope, as discussed above in step 320. Prior to estimating the skew angle, the microprocessor 202 may determine a mode value of the estimated angle of each measurable block in the second set of the measurable blocks. In an embodiment, the mode value of the estimated angle may correspond to a frequently obtained value of the estimated angle. For example, if the estimated angles of the four measurable blocks are 0.45, 0.45, 1.5, and 0.44, then the mode value is 0.45.

Further, the microprocessor 202 may determine a predetermined range of the estimated angle based on the determined mode value. Thereafter, the microprocessor 202 may estimate the skew angle of the image. The estimation of the skew angle of the image has been described later in conjunction with the FIG. 5. In an embodiment, the microprocessor 202 may utilize the following below equation to estimate the skew angle:

$$\theta = \text{median}(\text{angle values with the range of } [\text{mode}(A) - t_5 \text{ and mode}(A) + t_5)]) \quad (7)$$

where,

A=Estimated angles "$A(X_N)$" in all blocks "X" and their corresponding filtered labels "N", mode=Most frequently obtained value, and $t_5$=Fitting threshold value.

For example, if the estimated angle of a measurable block in the second set of measurable blocks is 0.463, then the microprocessor 202 utilizes the equation 7 to estimate the skew angle of the image. In an embodiment, if the microprocessor 202 determines that value of the estimated angles is almost similar for each measurable block in the second set of measurable blocks. Typically, in such scenarios, the microprocessor 202 may not process the rest of the measurable blocks to estimate the skew angle. Based on the consistency in the value of the estimated angles, the microprocessor 202 utilizes the equation 7 to estimate the skew angle of the image. For example, if the estimated angles for the four measurable blocks are 0.45, 0.45, 1.5, and 0.44. Further, the microprocessor 202 may not further process the rest of the measurable blocks for determining the estimated angles. Thereafter, the microprocessor 202 utilizes the equation 7 to estimate the skew angle of the image.

After estimating the skew angle of the image, the microprocessor 202 may correct the skew of the image by correcting the skew angle. Thereafter, based on the correcting the skew angle, the microprocessor 202 may obtain the skewed corrected image.

Further, the microprocessor 202 may repeat steps from step 314 to step 322 for each measurable block in the set of measurable blocks to determine the skew angle of the image.

Figure 4:
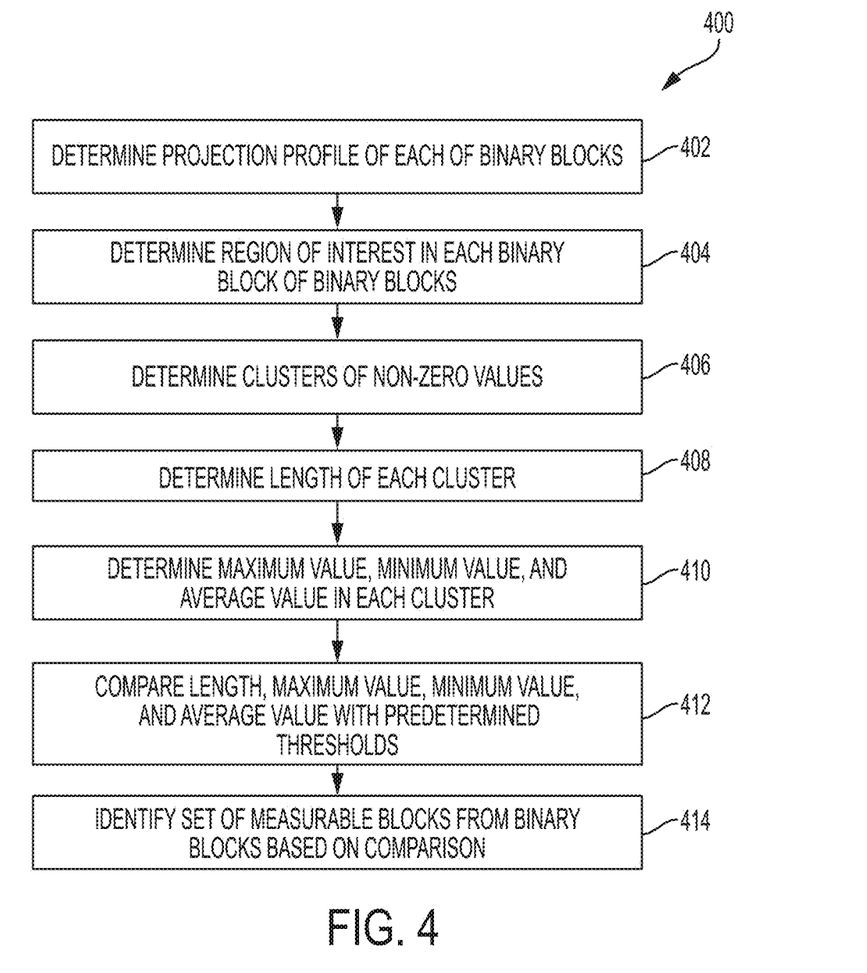
FIG. 4 is a flowchart illustrating a method for identifying a set of measurable blocks in an image, in accordance with at least one embodiment.

FIG. 4 is a flowchart 400 illustrating a method for identifying set of measurable blocks in an image, in accordance with at least one embodiment. The flowchart 400 has been described in conjunction with FIG. 1, FIG. 2, and FIG. 3.

At step 402, a projection profile of each of the one or more binary blocks is determined. In an embodiment, the microprocessor 202 may determine the projection profile of each of the one or more binary blocks. In an embodiment, the microprocessor 202 may obtain the one or more binary blocks by binarizing the pixels of each block in the one or more blocks, as discussed in step 308.

At step 404, a region of interest (ROI) in each binary block of the one or more binary blocks is determined. In an embodiment, the microprocessor 202 may determine the region of interest in each binary block based at least on the projection profile and a boundary condition, as discussed in step 310.

At step 406, one or more clusters of non-zero values are determined. In an embodiment, the microprocessor 202 may determine the one or more clusters of the non-zero values in the region of interest (ROI) vector, as discussed in step 312. The one or more clusters may correspond to a group of the non-zero values in a binary block. For example, in an ROI vector $P_2(X)$, the values are {0, 0, 100, 90, 0, 0, 70, 200, 50, 0, 0, 80, 20, 40, 0, 0}, then the microprocessor 202 forms the group of non-zero values in the ROI vector such as cluster $C_1$={100, 90}, cluster $C_2$={70, 200, 50}, and cluster $C_3$={80, 20, 40}.

At step 408, a length of each of the one or more clusters is determined. In an embodiment, the microprocessor 202 determines the length of each of the one or more clusters based on the non-zero values in each of the one or more clusters. For example, as discussed above, the microprocessor 202 forms the three clusters, i.e., the cluster $C_1$={100, 90}, cluster $C_2$={70, 200, 50}, and cluster $C_3$={80, 20, 40}. Based on the non-zero values in each cluster, the length of $C_1$, $C_2$, $C_3$ are 2, 3, and 3, respectively.

At step 410, a maximum value, a minimum value, and an average value in each of the one or more clusters is determined. In an embodiment, the microprocessor 202 may determine the maximum value, the minimum value, and the average value in each of the one or more clusters, as discussed in step 312. For example, as discussed above, in the ROI vector $P_2(X)$, the maximum value in $C_1$, $C_2$, $C_3$ are 100, 200, and 80, respectively. Similarly, the minimum value in $C_1$, $C_2$, $C_3$ are 90, 50, and 20, respectively. Further, the average value in $C_1$, $C_2$, $C_3$ are 95, 160, and 70, respectively.

At step 412, the length, the maximum value, the minimum value, and the average value are compared with the respective predetermined thresholds. In an embodiment, the microprocessor 202 may perform the comparison of the length, the maximum value, the minimum value, and the average value with respective predetermined thresholds by utilizing the equation 4 (as discussed in step 312) to determine whether the block is a measurable block or not.

At step 414, a set of measurable blocks from the one or more binary blocks is identified. In an embodiment, the microprocessor 202 identifies the set of measurable blocks from the one or more binary blocks based on the comparison. In an embodiment, the microprocessor 202 may perform the comparison of the length, the maximum value, the minimum value, and the average value with respective predetermined thresholds, as discussed in step 412.

Figure 5:
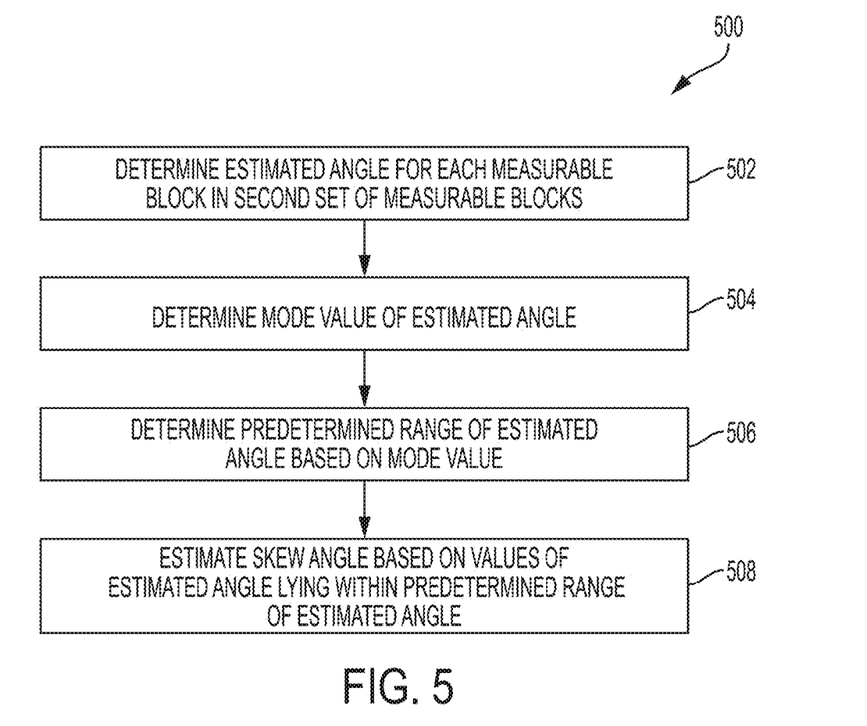
FIG. 5 is a flowchart illustrating a method for estimating a skew angle of an image, in accordance with at least one embodiment.

FIG. 5 is a flowchart 500 illustrating a method for estimating a skew angle of an image, in accordance with at least one embodiment. The flowchart 500 has been described in conjunction with FIG. 1, FIG. 2, and FIG. 3.

At step 502, an estimated angle for each measurable block in the second set of measurable blocks is determined. In an embodiment, the microprocessor 202 may determine the estimated angle for each measurable block in the second set of measurable blocks based on a slope of each measurable block in the second set of measurable blocks. In an embodiment, the microprocessor 202 may determine the slope of each measurable block in the second set of measurable blocks by utilizing the equation 5, as discussed in step 320. Thereafter, the microprocessor 202 utilizes the equation 6 (as discussed in the step 320), to determine the estimated angle.

At step 504, a mode value of the estimated angle is determined. In an embodiment, the microprocessor 202 may determine the mode value of the estimated angle of the each measurable block in the second set of measurable blocks, as discussed in step 322. In an embodiment, the mode value of the estimated angle may indicate the frequently obtained value of the estimated angle. For example, if the estimated angles for five measurable blocks are 0.46, 0.46, 0.48, 0.5, and 0.457. Further, the estimated angle 0.46 is the most frequently obtained value. Therefore, the mode value of the estimated angle is 0.46.

At step 506, a predetermined range of the estimated angle is determined. In an embodiment, the microprocessor 202 may determine the predetermined range of the estimated angle based on the mode value. In an embodiment, the microprocessor 202 may determine the mode value of the estimated angle of the each measurable block in the second set of measurable blocks, as discussed above.

At step 508, a skew angle of the image is estimated. In an embodiment, the microprocessor 202 may estimate the skew angle of the image based on the values of the estimated angle that lie within the predetermined range of the estimated angle. The microprocessor 202 may determine the estimated angle, and the predetermined range of the estimated angle by utilizing the equation 6 and the equation 7, respectively, as discussed above.

Figure 6:
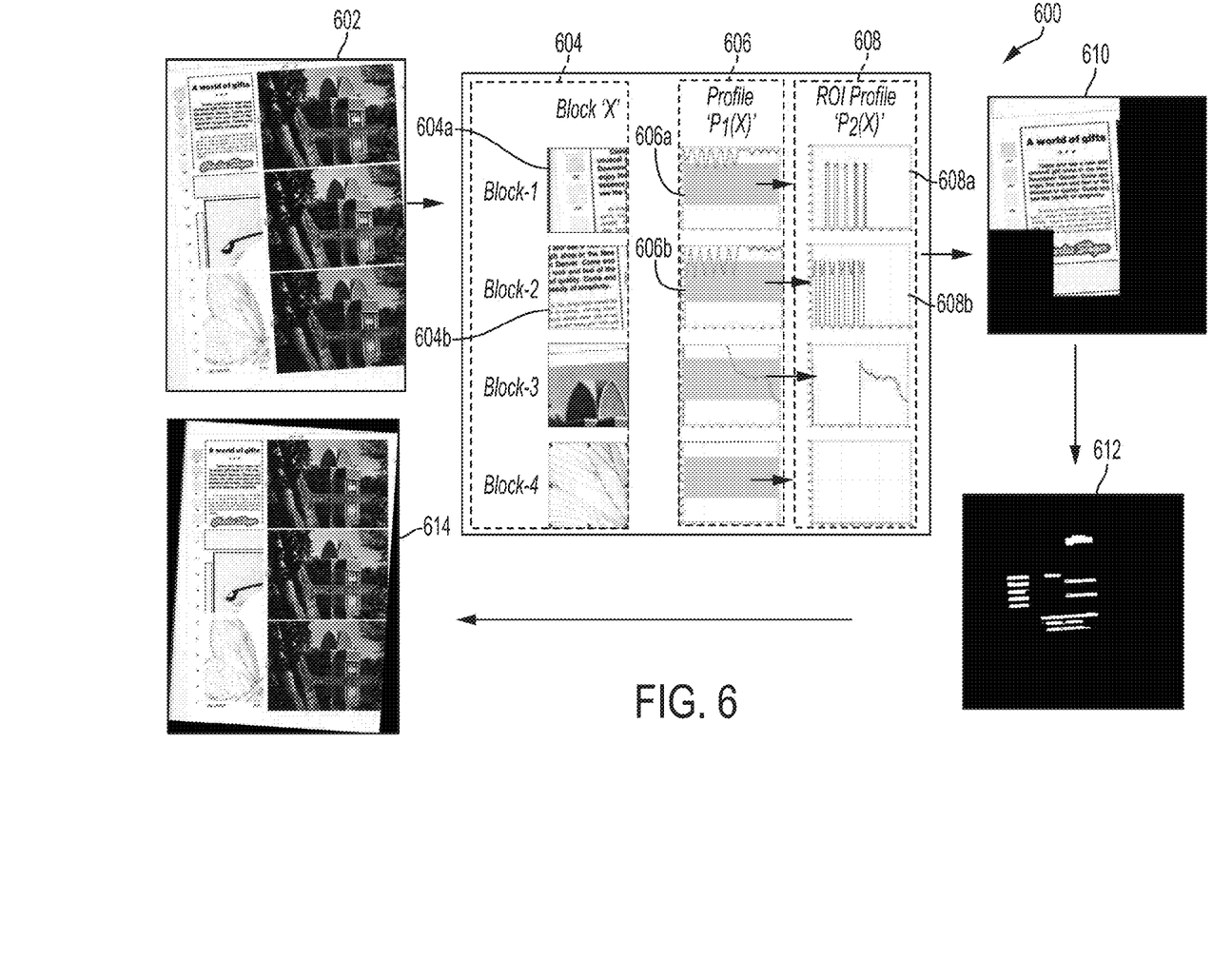
FIG. 6 illustrates a block diagram for processing an image to estimate a skew angle of an image, in accordance with at least one embodiment.

FIG. 6 illustrates a block diagram for processing an image to estimate a skew angle of an image, in accordance with at least one embodiment. The block diagram 600 has been described in conjunction with FIG. 1, FIG. 2, and FIG. 3.

As shown in FIG. 6, the microprocessor 202 may process an image (depicted by 602) to estimate a skew angle of the image 602. Further, the microprocessor 202 may divide the image 602 into one or more blocks (depicted by 604) of a predetermined size (as explained in step 304). For instance, the one or more blocks are block-1 to block-4 (depicted by 604*a*-604*d*). In an embodiment, the microprocessor 202 may determine a projection profile (depicted by 606) of each of the one or more blocks 604, as discussed in step 308. For instance, the projection profile of block 604*a* is depicted by 606*a*. Further, the microprocessor 202 determines ROI (depicted by 608) in each block of the one or more blocks 604, as discussed in step 310. Based on the projection profile and a boundary condition, the microprocessor 202 determines whether a block is a measurable block or not, by utilizing the equation 4 (as explained in step 312). For instance, the block-1 604*a*, and block-2 604*b* are measurable blocks (depicted by 610). On the other hand, block-3, and block-4 are not measurable blocks.

Further, the microprocessor 202 performs a morphological operation on the measurable blocks 610 (i.e., block-1, and block-2). Further, the microprocessor 202 may perform labelling (depicted by 612) on each modified measurable block in the set of modified measurable blocks. Further, the microprocessor 202 may select second set of measurable blocks from the measurable blocks to determine an estimated angle by utilizing the equation 6. Thereafter, based on the estimated angle, the skew angle is estimated (as explained in FIG. 3). Based on the estimated skew angle, the image 602 is corrected to form a skewed corrected image (depicted by 614).

The disclosed embodiments encompass numerous advantages. The disclosure provides for an estimation of a skew angle of an image by utilizing a block-based method. Through various embodiments of the disclosure, the image is divided into one or more blocks. Further, it is disclosed that a region of interest in each block of the one or more blocks is determined based at least on a projection profile of each of the one or more blocks. Further, it is disclosed that a set of measurable blocks is identified from the projection profile of each of the one or more blocks. Further, the identified set of measurable blocks is dilated with a rectangular structure element to create a set of modified measurable blocks. Such operation is not computationally complex and more accurate. Thereafter, a connected component-based processing is employed on the set of modified measurable blocks to identify a second set of measurable blocks from the set of modified measurable blocks. Further, it is disclosed that an estimated angle is determined for each measurable block in the second set of measurable blocks. Based on the estimated angle, the skew angle of the image is estimated. This method of estimating the skew angle of the image is more robust.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for estimating a skew angle of an image have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for estimating a skew angle of an image, said method comprising:
   identifying, by one or more microprocessors, a set of measurable blocks from one or more blocks in said image, wherein each of said one or more blocks in said image corresponds to a set of pixels of predetermined size, wherein each of said set of measurable blocks corresponds to a block that is identified based on a set of predetermined conditions;
   dilating, by said one or more microprocessors, each measurable block, in said set of measurable blocks, with a predetermined rectangular structure to create a set of modified measurable blocks;
   selecting, by said one or more microprocessors, a second set of measurable blocks from said set of modified measurable blocks based on a size of each modified measurable block in said set of modified measurable blocks; and
   determining, by said one or more microprocessors, a slope of each measurable block in said second set of measurable blocks, wherein said slope is utilizable to estimate said skew angle of said image.

2. The method of claim 1 further comprising converting, by said one or more microprocessors, said image to a grayscale image by utilizing a background suppression technique.

3. The method of claim 2 further comprising dividing, by said one or more microprocessors, said grayscale image into said one or more blocks of said predetermined size.

4. The method of claim 3 further comprising binarizing, by said one or more microprocessors, pixels of each block, in said one or more blocks, to obtain one or more binary blocks.

5. The method of claim 4 further comprising determining, by said one or more microprocessors, a projection profile of each of said one or more binary blocks.

6. The method of claim 5, wherein said projection profile corresponds to at least a horizontal projection profile, or a vertical projection profile.

7. The method of claim 5 further comprising determining, by said one or more microprocessors, a region of interest in said each block, in said one or more blocks, based at least on said projection profile and a boundary condition, wherein said region of interest comprises at least one of one or more text components, and one or more line components.

8. The method of claim 5, wherein said identification of said set of measurable blocks further comprises:
   determining, by said one or more microprocessors, one or more clusters of non-zero values in said projection profile of each of said one or more blocks;
   determining, by said one or more microprocessors, a length of each of said one or more clusters;
   determining, by said one or more microprocessors, a maximum value, a minimum value, and an average value, of said non-zero values, in each of said one or more clusters;
   comparing, by said one or more microprocessors, said length, said maximum value, said minimum value, and said average value with respective predetermined thresholds; and
   identifying, by said one or more microprocessors, said set of measurable blocks from said one or more blocks based on said comparison.

9. The method of claim 1 further comprising trimming, by said one or more microprocessors, a predetermined portion from a first end and a second end, of said each measurable block in said second set of measurable blocks.

10. The method of claim 9, wherein said first end and said second end are longitudinal ends of said each measurable block in said second set of measurable blocks.

11. The method of claim 1 further comprising determining, by said one or more microprocessors, an estimated angle for said each measurable block in said second set of measurable blocks based on said determined said slope.

12. The method of claim 11, wherein said estimation of said skew angle of said image further comprises:
   determining, by said one or more microprocessors, a mode value of said estimated angle of said each measurable block in said second set of measurable blocks;
   determining, by said one or more microprocessors, a predetermined range of said estimated angle based on said mode value; and
   estimating, by said one or more microprocessors, said skew angle based on values of said estimated angle, lying within said predetermined range of said estimated angle.

13. A system for estimating a skew angle of an image, said system comprising:
   one or more microprocessors operable to:
   identify a set of measurable blocks from one or more blocks in said image, wherein each of said one or more blocks in said image corresponds to a set of pixels of predetermined size, wherein each of said set of measurable blocks corresponds to a block that is identified based on a set of predetermined conditions;

dilate each measurable block, in said set of measurable blocks, with a predetermined rectangular structure to create a set of modified measurable blocks;

select a second set of measurable blocks from said set of modified measurable blocks based on a size of each modified measurable block in said set of modified measurable blocks; and determine a slope of each measurable block in said second set of measurable blocks, wherein said slope is utilizable to estimate said skew angle of said image.

14. The system of claim 13, wherein said one or more microprocessors are further operable to convert said image to a grayscale image by utilizing a background suppression technique.

15. The system of claim 14, wherein said one or more microprocessors are further operable to divide said grayscale image into said one or more blocks of said predetermined size.

16. The system of claim 15, wherein said one or more microprocessors are further operable to binarize pixels of each block, in said one or more blocks, to obtain one or more binary blocks.

17. The system of claim 16, wherein said one or more microprocessors are further operable to determine a projection profile of each of said one or more binary blocks.

18. The system of claim 17, wherein said one or more microprocessors are further operable to determine a region of interest in said each block, in said one or more blocks, based at least on said projection profile and a boundary condition, wherein said region of interest comprises at least one of one or more text components, and one or more line components.

19. The system of claim 17, wherein said identification of said set of measurable blocks further comprises:

one or more microprocessors operable to:

determine one or more clusters of non-zero values in said projection profile of each of said one or more blocks;

determine a length of each of said one or more clusters;

determine a maximum value, a minimum value, and an average value of said non-zero values, in each of said one or more clusters;

compare said length, said maximum value, said minimum value, and said average value with respective predetermined thresholds; and identify said set of measurable blocks from said one or more blocks based on said comparison.

20. The system of claim 13, wherein said one or more microprocessors are further operable to trim a predetermined portion from a first end and a second end, of said each measurable block in said second set of measurable blocks.

21. The system of claim 20, wherein said first end and said second end are longitudinal ends of said each measurable block in said second set of measurable blocks.

22. The system of claim 13, wherein said one or more microprocessors are further operable to determine an estimated angle for said each measurable block in said second set of measurable blocks based on said determined said slope.

23. The system of claim 22, wherein said estimation of said skew angle of said image further comprises:

one or more microprocessors operable to:

determine a mode value of said estimated angle of said each measurable block in said second set of measurable blocks;

determine a predetermined range of said estimated angle based on said mode value; and estimate said skew angle based on values of said estimated angle, lying within said predetermined range of said estimated angle.

24. A computer program product for use with a computer, the computer program product comprising a non-transitory computer readable medium, wherein the non-transitory computer readable medium stores a computer program code for estimating a skew angle of an image, wherein the computer program code is executable by one or more microprocessors to:

identify, by one or more microprocessors, a set of measurable blocks from one or more blocks in said image, wherein each of said one or more blocks in said image corresponds to a set of pixels of predetermined size, wherein each of said set of measurable blocks corresponds to a block that is identified based on a set of predetermined conditions;

dilate, by said one or more microprocessors, each measurable block, in said set of measurable blocks, with a predetermined rectangular structure to create a set of modified measurable blocks;

select, by said one or more microprocessors, a second set of measurable blocks from said set of modified measurable blocks based on a size of each modified measurable block in said set of modified measurable blocks; and determine, by said one or more microprocessors, a slope of each measurable block in said second set of measurable blocks, wherein said slope is utilizable to estimate said skew angle of said image.

* * * * *